United States Patent
Toomey

(10) Patent No.: US 10,935,254 B2
(45) Date of Patent: Mar. 2, 2021

(54) PIPE HEATING DEVICE

(71) Applicant: Kevin Toomey, Ft Collins, CO (US)

(72) Inventor: Kevin Toomey, Ft Collins, CO (US)

( * ) Notice: Subject to any disclaimer, the term of this patent is extended or adjusted under 35 U.S.C. 154(b) by 204 days.

(21) Appl. No.: 16/178,683

(22) Filed: Nov. 2, 2018

(65) Prior Publication Data

US 2020/0141590 A1    May 7, 2020

(51) Int. Cl.
*H05B 1/02* (2006.01)
*F24D 19/00* (2006.01)
*F24H 9/20* (2006.01)
*E03B 7/12* (2006.01)
*F16L 53/38* (2018.01)

(52) U.S. Cl.
CPC ............ *F24D 19/0095* (2013.01); *E03B 7/12* (2013.01); *F24H 9/2035* (2013.01); *F16L 53/38* (2018.01); *F24H 2250/02* (2013.01)

(58) Field of Classification Search
CPC .... H05B 1/02; H05B 2214/02; H05B 1/0291; H05B 3/58; H05B 2203/021; F24D 19/0095; F24H 2250/02; F24H 9/2035; E03B 7/12; F16L 53/38
USPC .......................... 219/490, 494, 497, 525, 534
See application file for complete search history.

(56) References Cited

U.S. PATENT DOCUMENTS

| | | | |
|---|---|---|---|
| 4,214,147 A * | 7/1980 | Kraver | F28F 19/006 |
| | | | 392/468 |
| 5,334,132 A | 8/1994 | Burkhead | |
| 5,859,953 A | 1/1999 | Nickless | |
| 6,021,798 A | 2/2000 | Martin | |
| 6,097,008 A | 8/2000 | Mahin | |
| 6,516,142 B2 * | 2/2003 | Grant | F24H 1/102 |
| | | | 392/451 |
| 6,536,458 B1 | 3/2003 | Kindermann | |
| 7,244,239 B2 | 7/2007 | Howard | |
| 7,563,236 B2 | 7/2009 | Kazmierczak | |
| 7,841,997 B1 | 11/2010 | Heller | |
| 8,985,154 B2 * | 3/2015 | Quigley | F16L 53/38 |
| | | | 138/33 |
| 9,395,102 B2 | 7/2016 | Hammer | |
| 9,797,606 B2 * | 10/2017 | Borovinov | F24D 19/1012 |
| 10,551,081 B1 * | 2/2020 | Miller-Russell | F24F 11/32 |
| 10,641,521 B2 * | 5/2020 | Wedam | B22D 17/24 |
| 2008/0011739 A1 * | 1/2008 | Park | F24H 3/004 |
| | | | 219/535 |
| 2014/0000724 A1 * | 1/2014 | Park | E03B 7/08 |
| | | | 137/78.1 |

* cited by examiner

*Primary Examiner* — Mark H Paschall

(57) ABSTRACT

A pipe heating device for preventing freezing of pipes includes a controller and a plurality of heating elements. The heating elements are operationally coupled to the controller and each heating element is configured to selectively couple to a respective pipe of a plumbing assembly. The controller is positioned to selectively power the heating element so that the heating element is configured to maintain water that is positioned in the respective pipe in a fluid state.

1 Claim, 4 Drawing Sheets

PIPE HEATING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relate to heating devices and more particularly pertains to a new heating device for preventing freezing of pipes.

BRIEF SUMMARY OF THE INVENTION

An embodiment of the disclosure meets the needs presented above by generally comprising a controller and a plurality of heating elements. The heating elements are operationally coupled to the controller and each heating element is configured to selectively couple to a respective pipe of a plumbing assembly. The controller is positioned to selectively power the heating element so that the heating element is configured to maintain water that is positioned in the respective pipe in a fluid state.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
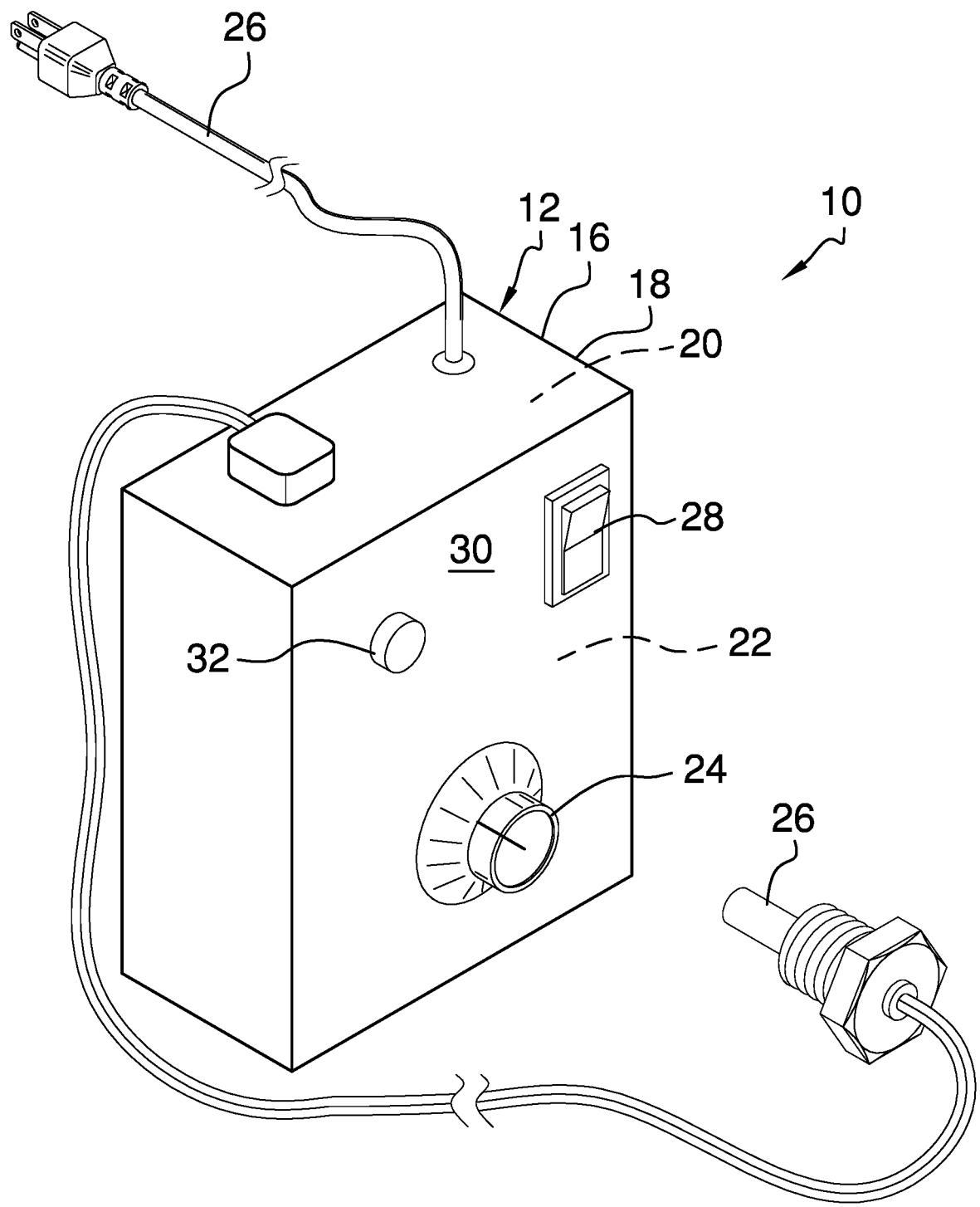
FIG. 1 is an isometric perspective view of a pipe heating device according to an embodiment of the disclosure.
Figure 2:
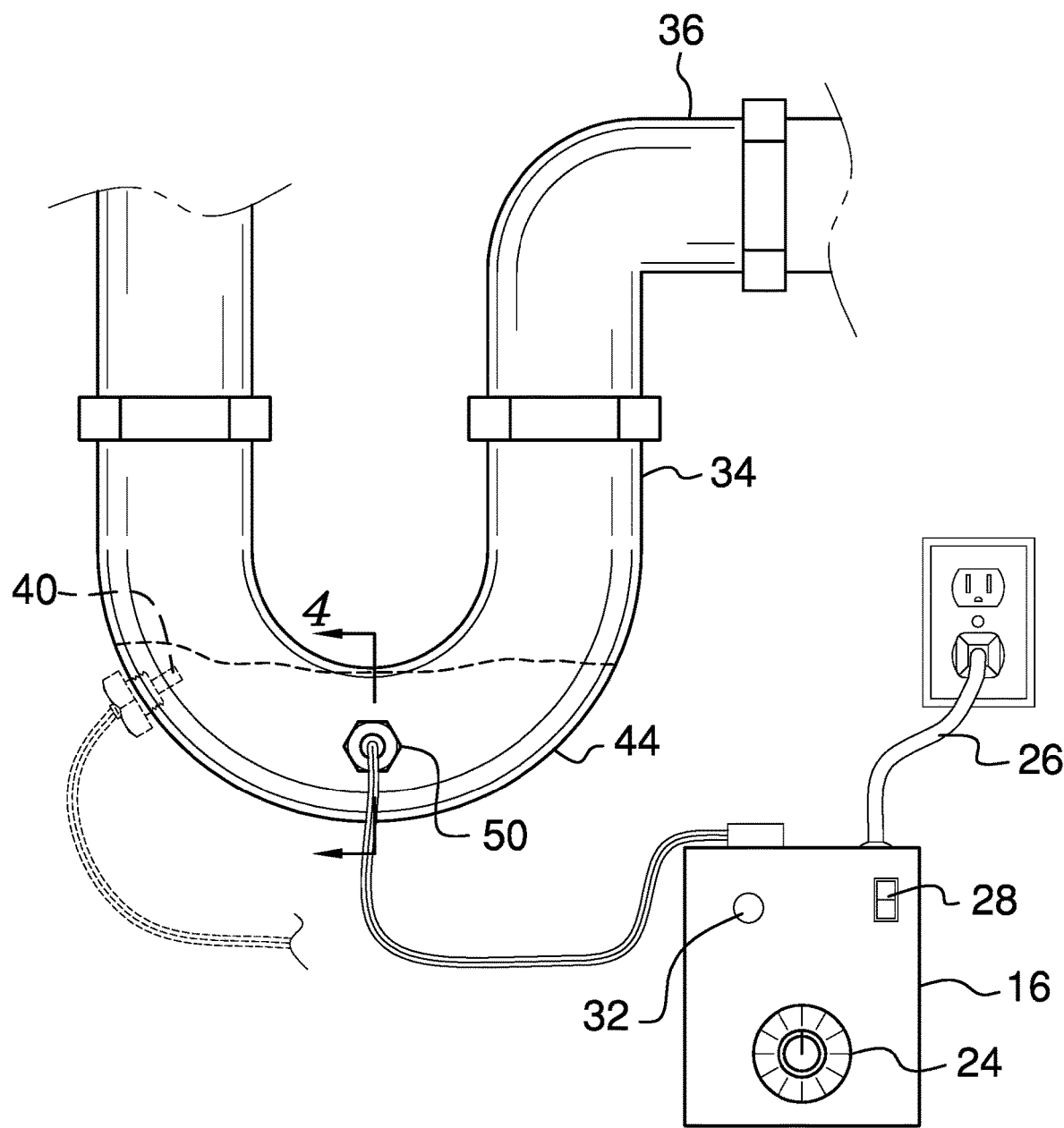
FIG. 2 is an in-use view of an embodiment of the disclosure.
Figure 3:
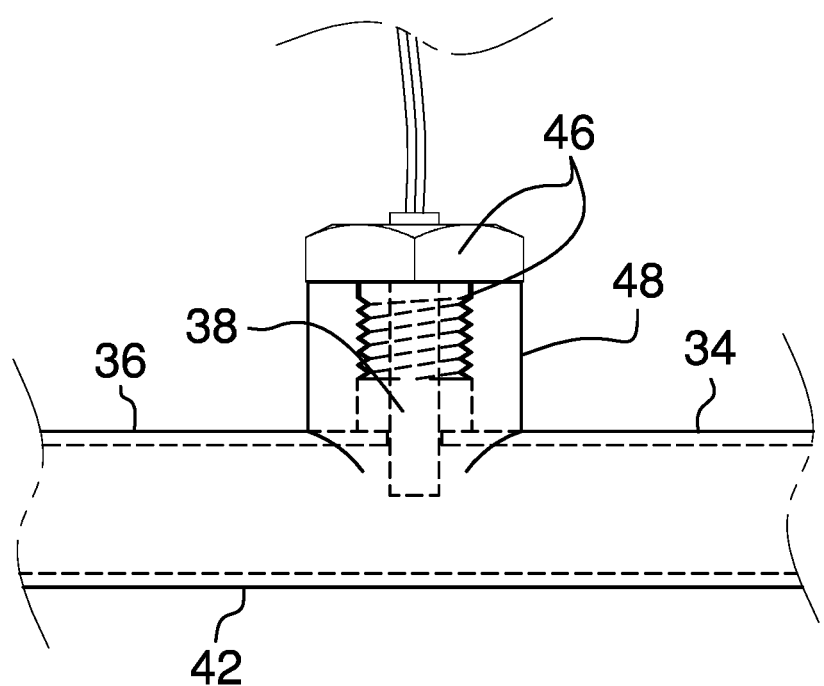
FIG. 3 is an in-use view of an embodiment of the disclosure.
Figure 4:
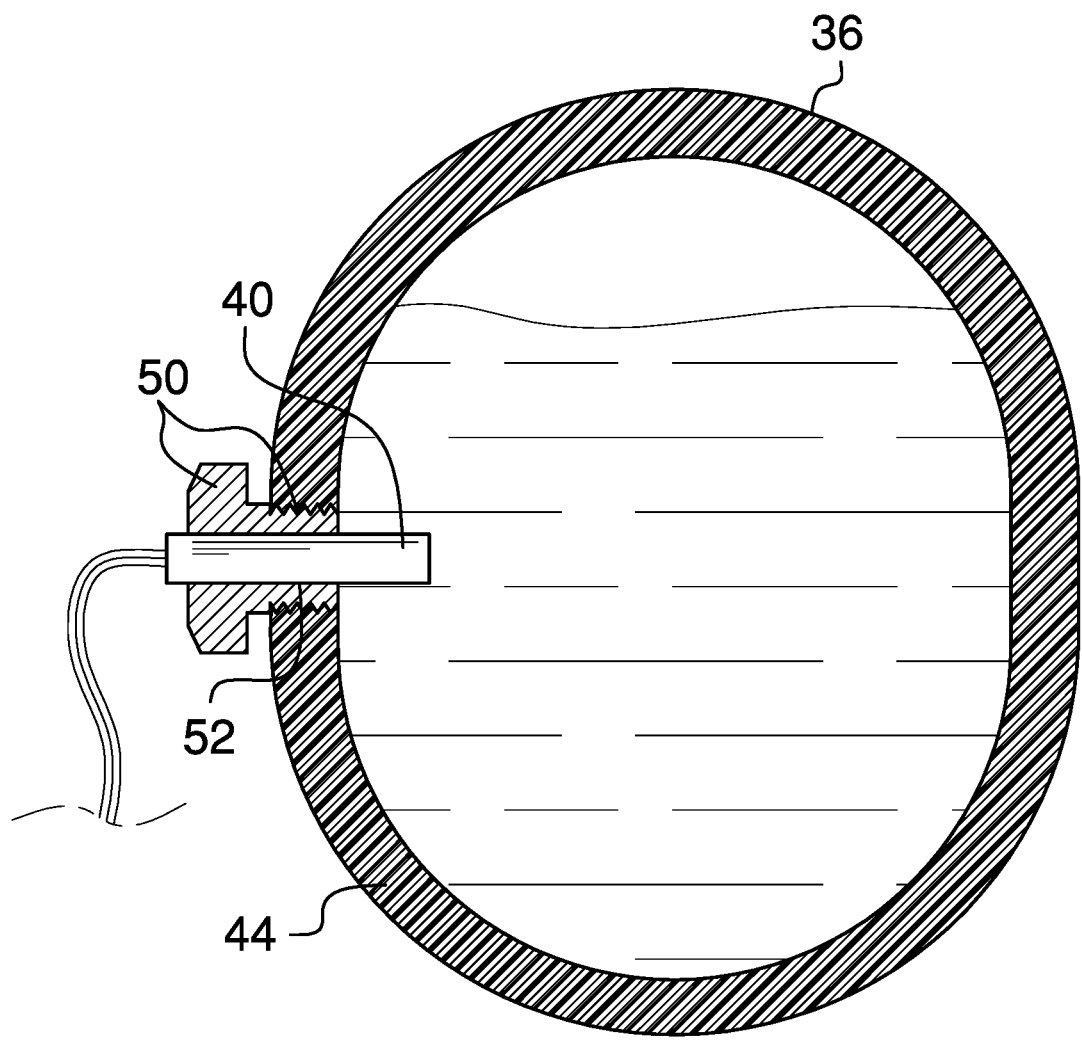
FIG. 4 is a cross-sectional view of an embodiment of the disclosure.

With reference now to the drawings, and in particular to FIGS. 1 through 4 thereof, a new heating device embodying the principles and concepts of an embodiment of the disclosure and generally designated by the reference numeral 10 will be described.

As best illustrated in FIGS. 1 through 4, the pipe heating device 10 generally comprises a controller 12 and a plurality of heating elements 14 that is operationally coupled to the controller 12. The controller 12 comprises a rheostat 16, or the like. The rheostat 16 comprises a housing 18 that defines an interior space 20. A variable resistor 22 is coupled to the housing 18 and is positioned in the interior space 20. A knob 24 is coupled to a front face 30 of the housing 18. The knob 24 is operationally coupled to the variable resistor 22. The knob 24 is configured to be turned to select a current output of the variable resistor 22. A power cord 26 is coupled to and extends from the housing 18. The power cord 26 is configured to couple to an electrical circuit.

A switch 28, which is toggle type, is coupled to the front face 30 of the housing 18. The switch 28 is operationally coupled to the variable resistor 22 and the power cord 26. The switch 28 is configured to be toggled to selectively couple the variable resistor 22 to the electrical circuit through the power cord 26.

A bulb 32 is coupled to the front face 30 of the housing 18 and is operationally coupled to the switch 28. The bulb 32 is configured to illuminate to indicate that the variable resistor 22 is operationally coupled to the electrical circuit.

Each heating element 14 is configured to selectively couple to a respective pipe 34 of a plumbing assembly 36 of a structure, such as house, modular home, or camper. The controller 12 is positioned to selectively power the heating element 14 so that the heating element 14 is configured to maintain water that is positioned in the respective pipe 34 in a fluid state. The device 10 is particularly suited for use with a plumbing assembly 36 of a structure wherein portions of the plumbing assembly 36 are positioned in an unheated setting within, or external to, the structure.

The plurality of heating elements 14 comprises a first heater 38 and a second heater 40. The first heater 38 is configured to be selectively coupled to a cold-water intake 42 of the plumbing assembly 36, while the second heater 40 is configured to be selectively coupled to a waste water trap 44 of the plumbing assembly 36. The heating element 14 is cartridge type and is configured to be positioned within the respective pipe 34 so that the heating element 14 is in contact with the water in the respective pipe 34.

A first coupler 46, which is externally threaded, is coupled to the first heater 38. The first coupler 46 is configured to be threadedly inserted into a connector 48 that is coupled to the cold-water intake 42 of the plumbing assembly 36 so that the first heater 38 is positioned in contact with the water in the cold-water intake 42. The connector 48 is T-type and sweated into the cold-water intake 42.

A second coupler 50, which is externally threaded, is coupled to the second heater 40. The second coupler 50 is configured to be threadedly inserted into a hole 52 that is positioned in the waste water trap 44 of the plumbing assembly 36 so that the second heater 40 is positioned in contact with the water in the waste water trap 44.

In use, the connector 48 is coupled to the cold-water intake 42 of the plumbing assembly 36 and the hole 52 is cut or drilled into the waste water trap 44. The first coupler 46 is threadedly inserted into the connector 48 so that the first heater 38 is positioned in contact with the water in the cold-water intake 42. The second coupler 50 is threadedly inserted into the hole 52 so that the second heater 40 is positioned in contact with the water in the waste water trap 44. The controller 12 selectively powers the first heater 38 and the second heater 40 to prevent freezing of the water that is positioned in the cold-water intake 42 and the waste water trap 44.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

The invention claimed is:
1. A pipe heating device comprising:
    a controller, the controller comprising a rheostat, the rheostat comprising:
        a housing defining an interior space,
        a variable resistor coupled to the housing and positioned in the interior space,
        a knob coupled to a front face of the housing, the knob being operationally coupled to the variable resistor wherein the knob is configured for turning for selecting a current output of the variable resistor,
        a power cord coupled to and extending from the housing wherein the power cord is configured for coupling to an electrical circuit,
        a switch coupled to the front face of the housing, the switch being toggle type, the switch being operationally coupled to the variable resistor and the power cord wherein the switch is configured for toggling for selectively coupling the variable resistor to the electrical circuit through the power cord, and
        a bulb coupled to the front face of the housing, the bulb being operationally coupled to the switch wherein the bulb is configured for illuminating for indicating operational coupling of the variable resistor to the electrical circuit;
    a plurality of heating elements operationally coupled to the controller, each heating element being configured for selectively coupling to a respective pipe of a plumbing assembly wherein the controller is positioned for selectively powering the heating element such that the heating element is configured for maintaining water in the respective pipe in a fluid state, the plurality of heating elements comprising a first heater and a second heater wherein the first heater is configured for selectively coupling to a cold-water intake of the plumbing assembly and the second heater is configured for selectively coupling to a waste water trap of the plumbing assembly, the heating element being cartridge type wherein the heating element is configured for positioning within the respective pipe such that the heating element is in contact with the water in the respective pipe;
    a first coupler coupled to the first heater, the first coupler being externally threaded wherein the first coupler is configured for threadedly inserting into a connector coupled to the cold-water intake of the plumbing assembly such that the first heater is positioned in contact with the water in the cold-water intake; and
    a second coupler coupled to the second heater, the second coupler being externally threaded wherein the second coupler is configured for threadedly inserting into a hole positioned in the waste water trap of the plumbing assembly such that the second heater is positioned in contact with the water in the waste water trap.

\* \* \* \* \*